(12) United States Patent
Scarsdale

(10) Patent No.: US 6,290,430 B1
(45) Date of Patent: Sep. 18, 2001

(54) SYSTEM FOR PUMPING LIQUIDS HAVING A LOW SPECIFIC GRAVITY FROM A SUBTERRANEAN STORAGE CAVERN

(75) Inventor: Kevin T. Scarsdale, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/390,256

(22) Filed: Sep. 3, 1999

(51) Int. Cl.[7] ........................................ B65G 5/00
(52) U.S. Cl. ................................. 405/53; 166/105
(58) Field of Search ............................ 166/105; 405/53

(56) References Cited

U.S. PATENT DOCUMENTS

| | | | |
|---|---|---|---|
| 2,780,070 | 2/1957 | Meade | 405/53 |
| 2,787,125 | 4/1957 | Benz | 405/53 |
| 2,880,593 | 4/1959 | Johnson et al. | 62/50.1 |
| 2,883,833 | 4/1959 | Miles | 405/53 |
| 2,884,761 | 5/1959 | Miles et al | 405/53 |
| 3,701,262 | 10/1972 | Connell et al. | 62/53.1 |
| 4,701,072 | * 10/1987 | Berezoutzky | 405/53 |
| 5,030,032 | 7/1991 | Mörsky et al. | 405/53 |
| 5,271,467 | * 12/1993 | Lynch | 166/105 X |
| 5,383,746 | * 1/1995 | Dufourneaud | 405/53 |

* cited by examiner

*Primary Examiner*—David Bagnell
*Assistant Examiner*—Tara L. Mayo
(74) *Attorney, Agent, or Firm*—Fletcher, Yoder & Van Someren

(57) ABSTRACT

A system and method for producing a low specific gravity liquid from underground storage. The system includes a subterranean cavern and a sump in fluid communication with a floor of the cavern. A bottom intake ESP system is deployed to draw liquid from the sump to fully drain the cavern without vaporizing the liquid at the pump intake.

20 Claims, 2 Drawing Sheets

SYSTEM FOR PUMPING LIQUIDS HAVING A LOW SPECIFIC GRAVITY FROM A SUBTERRANEAN STORAGE CAVERN

FIELD OF THE INVENTION

The present invention relates generally to the transfer of liquids having a low specific gravity and a low vapor pressure, such as liquid natural gas, and particularly to an electric submergible pumping system that may be utilized in pumping such liquids from subterranean storage caverns without vaporizing the liquid.

BACKGROUND OF THE INVENTION

Currently, certain substances having a low specific gravity and a low vapor pressure are stored in underground, i.e. subterranean caverns, in liquid form. Exemplary substances are liquid natural gas (LNG), isobutane and propane. Liquid natural gas, for example, may be maintained in a liquid state at approximately 60° F. under a pressure of approximately 30 psi. Thus, placing such substances in large, subterranean caverns provides a way to maintain large quantities of the substance in liquid form during storage.

An exemplary subterranean, storage cavern may be formed by washing away the salt from a natural salt mine to create a cavern. The substance, such as liquid natural gas, is then pumped into the storage cavern and stored in this cool environment under sufficient pressure to maintain the substance in liquid form. A current method for producing the liquid from the storage cavern is to use brine to force the product from the cavern. This technique requires a separate pond, typically at the earth's surface, for storage of the brine when the cavern is full of the desired substance. A pump is utilized in moving the brine from the pond and into the cavern to force the liquid product from the cavern. The surface brine ponds are extremely expensive to build and maintain.

It would be advantageous to eliminate the use of brine introduced into the storage cavern for moving the low specific gravity liquid to a location at or above the surface of the earth.

SUMMARY OF THE INVENTION

The present invention features a method for producing a liquid that has a low specific gravity and is stored in a subterranean cavern. The method includes forming a sump adjacent a floor of a subterranean cavern in which a liquid having a low specific gravity is stored. The method further includes deploying an electric submergible pumping system to the sump, and locating a pump intake of the electric submergible pumping system in the sump. The intake is located at a sufficient distance beneath the floor such that the liquid in the sump has a head sufficient to prevent substantial vaporization of the liquid when exposed to a net positive suction head at the pump intake during operation of the electric submergible pumping system.

According to another aspect of the invention, a method is provided for producing a liquid from a subterranean environment. The liquid is of the type subject to vaporization at normal pressures and temperatures on the surface of the earth. Specifically, the method includes forming a subterranean storage cavern with a sump region extending downwardly from a lower floor. The method further includes storing a liquid in the subterranean storage cavern, and deploying an electric submergible pumping system such that it is in communication with the sump region. The electric submergible pumping system is used to draw fluid from the sump region through a pump intake. Additionally, the method includes locating the pump intake beneath the lower floor a sufficient distance to substantially eliminate vaporization of the liquid when subjected to a lowered pressure at the pump intake during operation of the electric submergible pumping system.

According to another aspect of the present invention, a system is provided for storing and producing a substance having a low specific gravity and a low vapor pressure. Low vapor pressure refers to a characteristic of the substance that tends to cause vaporization of the substance at normal temperatures and pressures along the surface of the earth. The system includes a storage cavern disposed in a subterranean environment. The storage cavern is designed to store the substance in a liquid form. The system further includes a sump region disposed in fluid communication with the storage cavern at a position generally beneath the storage cavern. Additionally, a pump is disposed in fluid communication with a pump intake. The pump intake is located in the sump region at a sufficient depth to substantially eliminate vaporization of the substance when exposed to a net positive suction head of the pump.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
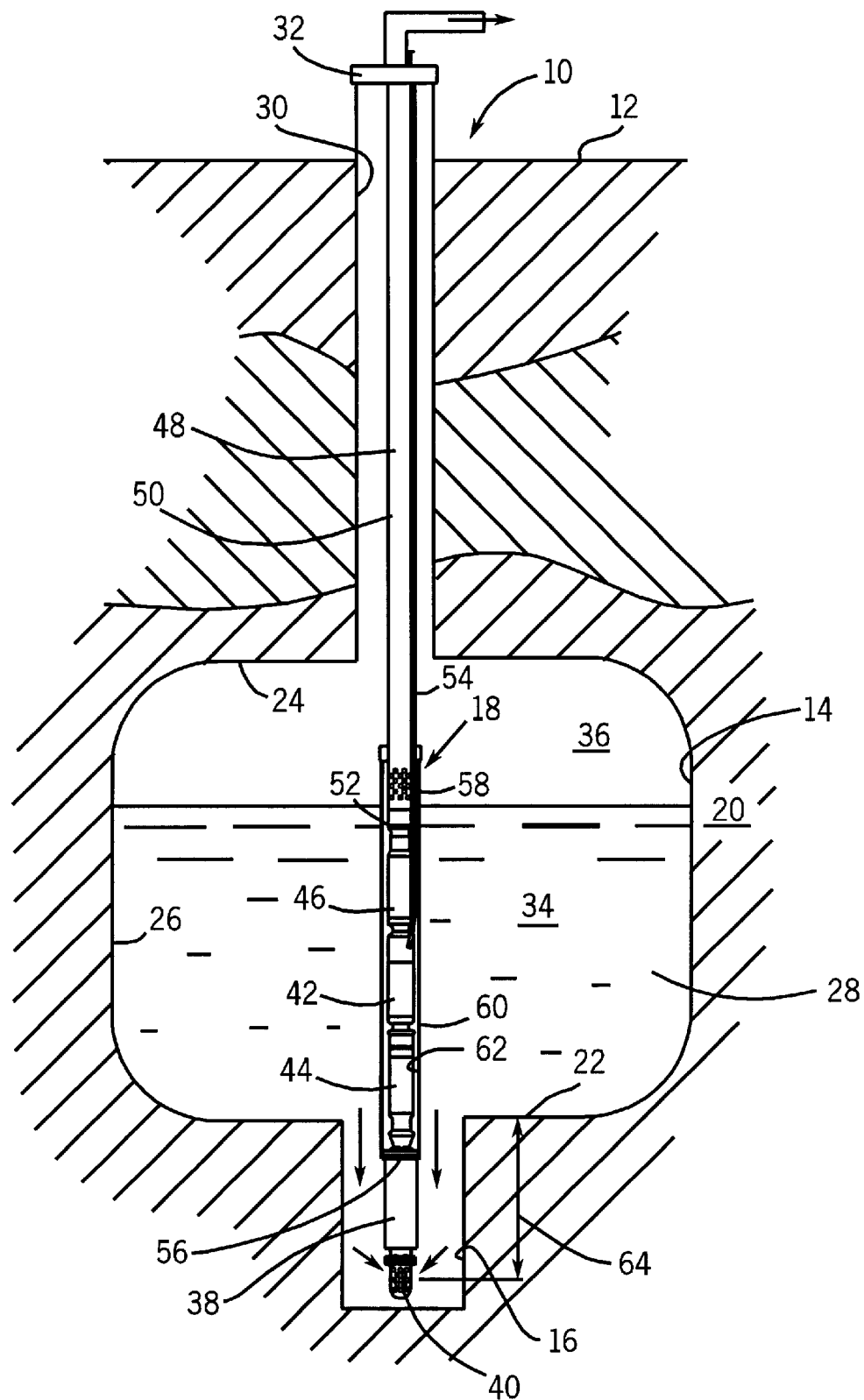
FIG. 1 is a front elevational view of an exemplary storage and production system, according to one embodiment of the present invention.

Referring generally to FIG. 1, a substance handling system 10 is illustrated according to a preferred embodiment of the present invention. System 10 provides for the storage of a substance in liquid form in a subterranean environment. Additionally, system 10 facilitates the production of such substance from the subterranean environment to a location at or above a surface 12 of a planet, e.g., the earth.

System 10 comprises a subterranean storage cavern 14, a sump region 16 and an electric submergible pumping system 18. Sump region 16 is in fluid communication with storage cavern 14. Similarly, electric submergible pumping system 18 is in fluid communication with sump region 16, such that liquid may be drawn from sump region 16.

Subterranean storage cavern 14 preferably is disposed within a geological formation 20. Storage cavern 14 may be formed in a variety of ways including drilling, mining, blasting, utilization of existing caverns, or by washing away material, such as naturally occurring salt. Generally, cavern 14 includes a lower surface or floor 22, an upper surface or ceiling 24 and a side wall 26 extending between floor 22 and ceiling 24. A substance 28, having a low specific gravity and a low vapor pressure, is stored in cavern 14. Exemplary substances are liquid natural gas (LNG), isobutane and propane. Typically, a wellbore 30 extends between storage cavern 14 and surface 12. Wellbore 30 is sealed by a cap 32 to prevent the escape of vaporized substance 28.

Substance 28 is pumped into storage cavern 14 according to conventional methods utilized in moving such substances to underground storage caverns. When cavern 14 is filled, substance 28 is primarily a liquid 34. However, the substance tends to vaporize and form a vapor 36 above liquid 34. As liquid 34 is removed, a greater portion of cavern 14 is filled with vapor 36. As explained above, vapor 36 typically is not allowed to escape.

Sump region 16 is in fluid communication with storage cavern 14, and extends downwardly from floor 22. Sump 16 may be formed by, for example, drilling, and it generally is axially aligned with wellbore 30. Thus, when electric submergible pumping system 18 is deployed, it can be lowered into sump region 16, as illustrated in FIG. 1. An exemplary sump region is large enough to permit fluid to flow from storage cavern 14 into sump region 16 about the portion of electric submergible pumping system 18 that extends into sump region 16. An exemplary sump region 16 is approximately 8 feet to approximately 32 feet deep. In other words, the sump extends approximately 8 feet to approximately 32 feet below floor 22.

An exemplary electric submergible pumping system 18 for use in substance handling system 10 comprises a bottom intake electric submergible pumping system. Pumping system 18 includes a submergible pump 38 in fluid communication with a pump intake 40. In the illustrated embodiment, submergible pump 38 is connected directly to pump intake 40. Submergible pumping system 18 further includes a submergible motor 42 coupled to submergible pump 38 to provide power thereto. A motor protector 44 is disposed between submergible motor 42 and submergible pump 38. Additionally, an expansion chamber 46 may be coupled to submergible motor 42. It should be noted that the electric submergible pumping system components are listed to represent an exemplary electric submergible pumping system, and that a variety of other or additional components can be utilized in such submergible pumping systems.

Pumping system 18 is deployed in wellbore 30 by a deployment system 48 that may have a variety of forms and configurations. For example, deployment system 48 may comprise tubing, such as production tubing 50 or coil tubing, connected with submergible pumping system 18 at a connector 52. Power is provided to submergible motor 42 via a power cable 54.

In the illustrated pumping system, submergible pump 38 includes a liquid discharge 56, and production tubing 50 includes a liquid inlet 58 Inlet 58 may be in the form of perforations through the outer wall of production tubing 50. A shroud 60 extends from submergible pump 38 at a position beneath liquid discharge 56 to production tubing 50 at a point above liquid inlet 58. Shroud 60 is sealed to pump 38 and production tubing 50 at its lower and upper ends. Additionally, shroud 60 preferably is concentric with the submergible pumping system components and sized to provide flow space between the components of electric submergible pumping system 18 and an interior surface 62 of shroud 60.

In operation, submergible motor 42 drives submergible pump 38 which draws liquid from sump region 16 through pump intake 40. This liquid is discharged through liquid discharge 56 and flows upwardly along the submergible pumping system components within shroud 60. The liquid is forced into production tubing 50 through liquid inlet 58 and delivered upwardly through the production tubing to a location at or above surface 12. The submergible pump 38 is able to maintain the liquid at sufficient pressure to prevent vaporization during the transfer, for instance, to the earth's surface. For example, the output of the pump and the outflow of liquid can be controlled to maintain the produced liquid at 150 psi above atmospheric pressure, 300 psi above atmospheric pressure, or greater depending on the type of substance being pumped. The higher pressures potentially allow the liquid to be pumped directly into a pipeline without the use of a transfer station.

In the preferred embodiment, pump intake 40 is located at a position in the sump region at a sufficient depth within the sump region to substantially eliminate vaporization of the substance 28 when exposed to a net positive suction head at pump intake 40, even when the liquid is drained to cavern floor 22. The net positive suction head is created by electric submergible pumping system 18, and particularly submergible pump 38, which draws liquid into pump intake 40 by reducing the internal pressure within submergible pump 38. Thus, pump intake 40 must be located at a sufficient distance (labeled distance 64) beneath floor 22 to avoid vaporization of the low specific gravity liquid when liquid 34 is drawn down to floor 22. In other words, the pressure applied on the liquid 34 as it enters intake 40 by the liquid head established in sump region 16 must be sufficient to prevent vaporization, i.e. flashing, of the liquid when exposed to the net positive suction head created by submergible pump 38.

Without sump region 16, submergible pumping system 18 cannot be used efficiently in the complete removal of liquid from storage cavern 14. In the latter situation, as liquid 34 is drawn downwardly towards the lowest level at floor 22, substance 28 tends to vaporize as its liquid level lowers to a point where the pressure applied by the liquid head is less than the net positive suction head created by pump 38 at pump intake 40. Once the liquid vaporizes, the electric submergible pumping system 18 no longer functions, and components, such as submergible pump 38, can be damaged. Consequently, a large volume of liquid cannot be pumped from the lower portion of cavern 14. Sump region 16, on the other hand, permits the liquid to be drained to floor 22, leaving only a small volume of liquid in sump region 16.

Preferably, pump intake 40 is placed at a location proximate the bottom of sump region 16. In a typical example, pump intake 40 is placed approximately 1 foot to 3 feet above the bottom of sump region 16.

Figure 2:
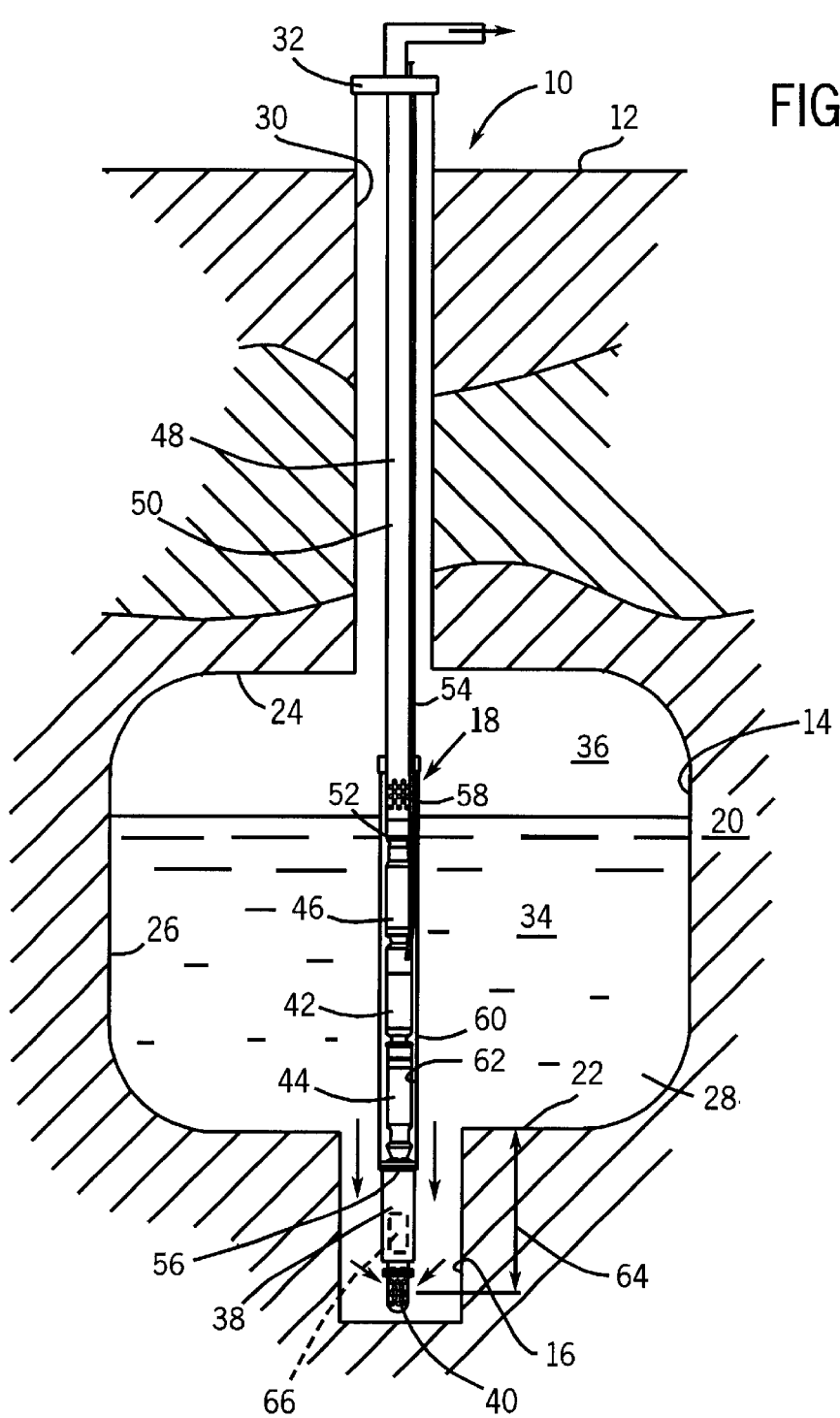
FIG. 2 is a front elevational view similar to FIG. 1 but showing an alternate embodiment.

As illustrated in FIG. 2, the net positive suction head created by electric submergible pumping system 18 can be decreased through the addition of an inducer 66. An inducer 66 is coupled to or combined with submergible pump 38 and effectively lowers the net positive suction head created at pump intake 40. Thus, for a given bottom intake electric submergible pumping system 18, the net positive suction head can be lowered, and the depth of sump region 16 decreased. For example, inducer 66 may be designed to decrease the net positive suction head by approximately fifty percent. The depth of sump region 16 then also can be decreased by approximately fifty percent.

Figure 3:
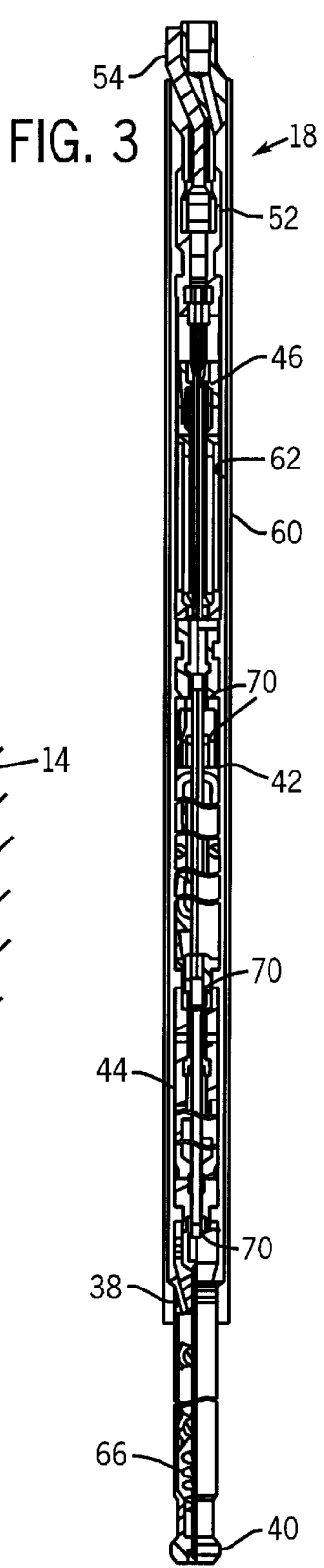
FIG. 3 is a cross-sectional view taken generally along the axis of the electric submergible pumping system illustrated in FIG. 2 to show various internal components.

Liquids having low specific gravity, such as LNG, isobutane and propane, tend to have low lubricity. Accordingly, it is preferred to substitute standard electric submergible pumping system bearings with self-lubricating bearings that are made of, for example, graphite or carbon impregnated bronze. As illustrated in FIG. 3, a plurality of self-lubricating bearings 70 are disposed throughout submergible motor 42, motor protector 44 and submergible pump 38. Self-lubricating bearings 70 promote the longevity of electric submergible pumping system 18 when utilized in substance handling system 10.

It will be understood, however, that the foregoing description is of preferred embodiments of this invention, and that the invention is not limited to the specific forms shown. For example, a wide variety of subterranean caverns may be utilized; a variety of submergible pumping systems and pumping system components may be used; and various substances may be stored. These and other modifications may be made in the design and arrangement of the elements without departing from the scope of the invention as expressed in the appended claims.

What is claimed is:

1. A method for producing a liquid from a subterranean cavern, comprising:
    forming a sump adjacent a floor of a subterranean storage cavern for use in storing a liquid subject to vaporization at atmospheric pressure;
    deploying a bottom intake electric submergible pumping system to the sump; and
    locating a pump intake of the electric submergible pumping system in the sump at a sufficient distance beneath the floor such that the liquid in the sump has a head sufficient to prevent substantial vaporization of the liquid when exposed to a net positive suction head at the pump intake during operation of the electric submersible pumping system.

2. The method as recited in claim 1, further comprising pumping the liquid through a production tubing to a surface of the earth.

3. The method as recited in claim 2, further comprising maintaining the liquid under a pressure greater than atmospheric pressure as it moves through the production tubing.

4. The method as recited in claim 3, wherein maintaining comprises maintaining the liquid at a pressure at least 150 psi greater than atmospheric pressure.

5. The method as recited in claim 3, wherein maintaining comprises maintaining the liquid at a pressure at least 300 psi greater than atmospheric pressure.

6. The method as recited in claim 1, wherein deploying includes deploying a submergible motor, a submergible pump and a submergible motor protector.

7. The method as recited in claim 1, further comprising employing a plurality of self lubricating bearings in the electric submersible pumping system.

8. A method for producing a liquid from a subterranean cavern, comprising:
    forming a sump adjacent a floor of a subterranean storage cavern for use in storing a liquid subject to vaporization at atmospheric pressure;
    deploying an electric submergible pumping system to the sump;
    locating a pump intake of the electric submergible pumping system in the sump at a sufficient distance beneath the floor such that the liquid in the sump has a head sufficient to prevent substantial vaporization of the liquid when exposed to a net positive suction head at the pump intake during operation of the electric submersible pumping system; and
    incorporating an inducer at an upstream position relative to the submergible pump to reduce the net positive suction head.

9. A method for producing a liquid from a subterranean environment when the liquid is subject to vaporization at the surface of the earth, comprising:
    forming a subterranean storage cavern with a sump region extending downwardly from a lower floor;
    storing a liquid in the subterranean storage cavern;
    deploying an electric submergible pumping system in communication with the sump region to draw liquid from the sump region through a pump intake; and
    locating the pump intake beneath the lower floor a sufficient distance to substantially eliminate vaporization of the liquid when subjected to a lowered pressure at the pump intake during drainage of the subterranean storage cavern.

10. The method as recited in claim 9, wherein storing includes storing liquid natural gas.

11. The method as recited in claim 9, wherein storing includes storing isobutane.

12. The method as recited in claim 9, wherein storing including storing propane.

13. The method as recited in claim 9, further comprising employing a plurality of self lubricating bearings in the electric submersible pumping system.

14. The method as recited in claim 9, further comprising pumping the liquid to a location at or above the surface of the earth at a pressure greater than the fluid vapor pressure of the liquid.

15. A method for producing a liquid from a subterranean environment when the liquid is subject to vaporization at the surface of the earth, comprising:
    forming a subterranean storage cavern with a sump region extending downwardly from a lower floor;
    storing a liquid in the subterranean storage cavern;
    deploying an electric submergible pumping system in communication with the sump region to draw liquid from the sump region through a pump intake;
    locating the pump intake beneath the lower floor a sufficient distance to substantially eliminate vaporization of the liquid when subjected to a lowered pressure at the pump intake during drainage of the subterranean storage cavern; and
    combining an inducer with the electric submergible pumping system to reduce the net positive suction head at the pump intake.

16. A system for storing and producing a substance subject to vaporization at the surface of the earth, comprising:
    a storage cavern disposed in a subterranean environment the storage cavern being designed to store the substance in a liquid form;
    a sump region disposed in fluid communication with the storage cavern at a position generally beneath the storage cavern;
    a pump disposed in fluid communication with a pump intake located in the sump region at a sufficient depth to substantially eliminate vaporization of the substance when exposed to a net positive suction head of the pump;
    a tubing positioned to receive the substance after being discharged from the pump; and
    a shroud to direct the substance from the pump to the tubing.

17. The system as recited in claim 16, further comprising a submergible motor connected to the pump, wherein the pump is a submergible pump.

18. The system as recited in claim 17, further comprising a length of tubing extending from the surface of the earth, through at least a substantial portion of the storage cavern, wherein the pump is able to discharge the substance through the length of tubing.

19. A system for storing and producing a substance subject to vaporization at the surface of the earth, comprising:

a storage cavern disposed in a subterranean environment the storage cavern being designed to store the substance in a liquid form;

a sump region disposed in fluid communication with the storage cavern at a position generally beneath the storage cavern;

a pump disposed in fluid communication with a pump intake located in the sump region at a sufficient depth to substantially eliminate vaporization of the substance when exposed to a net positive suction head of the pump; and an inducer coupled between the pump and the pump intake.

20. The system as recited in claim 19, further comprising a motor protector coupled to the submergible motor.

* * * * *